United States Patent
Janot et al.

(10) Patent No.: US 10,416,741 B2
(45) Date of Patent: Sep. 17, 2019

(54) FIXED TERMINAL TRANSFORMABLE INTO A FIXED/PORTABLE TERMINAL, AND ASSOCIATED METHOD OF TRANSFORMATION AND AUTONOMY MANAGEMENT SYSTEM

(71) Applicant: INGENICO GROUP, Paris (FR)

(72) Inventors: Cyril Janot, Dijon (FR); Didier Georges, Chabeuil (FR); Caroline Wolff, Suresne (FR); Alain Soubirane, Bourg-les-Valence (FR); Ludovic Neveu, Saint-Maurice (FR); Etienne Lebonnois, La Baume d'Hostun (FR); Stephane Estorges, Paris (FR)

(73) Assignee: INGENICO GROUP, Paris (FR)

(*) Notice: Subject to any disclaimer, the term of this patent is extended or adjusted under 35 U.S.C. 154(b) by 328 days.

(21) Appl. No.: 15/186,052

(22) Filed: Jun. 17, 2016

(65) Prior Publication Data
US 2016/0370832 A1    Dec. 22, 2016

(30) Foreign Application Priority Data

Jun. 19, 2015 (FR) ..................... 15 55639

(51) Int. Cl.
| G06F 1/26 | (2006.01) |
| G06Q 20/20 | (2012.01) |
| G06Q 20/32 | (2012.01) |
| H04B 1/3877 | (2015.01) |
| H04B 1/3883 | (2015.01) |
| G06Q 20/08 | (2012.01) |
| H04W 88/02 | (2009.01) |

(52) U.S. Cl.
CPC ............... *G06F 1/26* (2013.01); *G06Q 20/08* (2013.01); *G06Q 20/20* (2013.01); *G06Q 20/32* (2013.01); *H04B 1/3877* (2013.01); *H04B 1/3883* (2013.01)

(58) Field of Classification Search
USPC ............................................. 705/16
See application file for complete search history.

(56) References Cited

U.S. PATENT DOCUMENTS

| 5,793,123 A | 8/1998 | Ho et al. |
| 2007/0194526 A1 | 8/2007 | Randall |
| 2011/0255216 A1 | 10/2011 | Buschmann et al. |
| 2011/0293981 A1 | 12/2011 | Fang et al. |
| 2012/0157173 A1* | 6/2012 | Kim ................... G06F 1/1626 455/575.4 |
| 2014/0089346 A1* | 3/2014 | Li .................... G06F 21/6218 707/781 |

FOREIGN PATENT DOCUMENTS

| EP | 0968483 B1 | 10/2002 |
| FR | 2968478 A1 | 6/2012 |

OTHER PUBLICATIONS

English translation of the French Search Report and Written Opinion dated Apr. 1, 2016 for corresponding French Application No. 1555639, filed Jun. 19, 2015.
Machine English Translation of the Office Action dated Sep. 27, 2018 for corresponding European Application No. 161746890.4.

* cited by examiner

*Primary Examiner* — Garcia Ade
(74) *Attorney, Agent, or Firm* — David D. Brush; Westman, Champlin & Koehler, P.A.

(57) ABSTRACT

A fixed electronic terminal including at least one location intended to reversibly receive an electronic autonomy management system of the terminal.

5 Claims, 3 Drawing Sheets

FIXED TERMINAL TRANSFORMABLE INTO A FIXED/PORTABLE TERMINAL, AND ASSOCIATED METHOD OF TRANSFORMATION AND AUTONOMY MANAGEMENT SYSTEM

FIELD OF THE INVENTION

This invention relates to the field of fixed electronic payment terminals, and more particularly to fixed electronic payment terminals that have a certain degree of autonomy with regards to their electrical power supply.

SOLUTIONS OF PRIOR ART

The problem of rendering mains-powered electronic devices resistant to power cut-offs has been a long-standing issue.

The commonly provided solution consists in proposing an electronic device that includes an autonomous power supply on a battery able to take over from the main power supply in the event the latter is cut off. In this case, the battery is not dimensioned to allow for long autonomy as in the case of a piece of mobile equipment, but rather to allow for the proper operation of the equipment during voltage clips in the mains power or possibly to allow the equipment to shut down correctly, without damaging its current logic state for example.

In the case of a fixed payment terminal, there is for example an interest in having sufficient autonomy in order to make it possible to ensure the end of a transaction that has already been initiated, but also to make it possible to provide an autonomy that is sufficient to authorise transactions in portable mode. This can be the case with the goal of allowing easier manipulation of the terminal during the keying of data on the terminal for example.

Moreover, the type of backup power supply is integrated into the devices that propose this type of service when they are manufactured.

However, a battery, even of limited capacity, remains a non-negligible cost with respect to the total cost of an electronic terminal. Likewise, the autonomy management electronics remain substantially the same regardless of the capacity of the battery. This generates an extra cost which can be prohibitive for a function which can be reduced to resisting voltage clips. Certain users of fixed terminals can as such not be interested by such autonomy, preferring to retain a conventional solution at a lesser cost.

There is therefore a need for a solution that makes it possible to render a fixed electronic payment terminal resistant to power supply cut-offs as well as to be able to be mobile over a reduced zone, at least cost.

There is also a need for this updating to be possible during the lifecycle of the fixed terminal in order to offer an optimum solution in terms of cost, in a competitive environment where the price of a terminal is an essential stake for manufacturers.

SUMMARY OF THE INVENTION

An exemplary aspect of the present disclosure relates to a fixed electronic terminal comprising at least one location intended to reversibly receive an electronic autonomy management system of the terminal.

As such, an aspect of the disclosure proposes a new and inventive solution for enabling the transformation of a fixed electronic terminal into a fixed/mobile electronic terminal that resists to untimely mains power supply cut-offs as well as offering sufficient autonomy in order to authorise transactions in portable mode, while still maintaining an optimum cost for the solution.

Indeed, an aspect of the disclosure provides that the autonomy management system be entirely optional, with all of the hardware components required for this onboard/autonomous power supply being installed on board the terminal only when the benefit of this functionality is desired. The cost of the "bare" fixed terminal, i.e. without the electronic autonomy management system, remains as such equivalent to that of a standard fixed electronic terminal.

To do this, an aspect of the disclosure proposes a fixed electronic terminal having a location that makes it possible to connect, in a reversible manner, an electronic autonomy management system of the terminal. For example, this electronic autonomy management system of the terminal can include two main elements/modules consisting of a battery and an electronic module that allow for the proper operation of the terminal when it is powered by the battery.

According to a particular embodiment, the terminal comprises a removable trap door that at least partially covers the location when it is positioned in the terminal.

As such, according to this embodiment, the terminal has a removable trap door suited to protect the location intended to receive the electronic autonomy management system. Advantageously, this protection relates to the connecting equipment intended for the connection to the terminal of the electronic parts of this management system. As such, during the transformation of the fixed terminal into a fixed/mobile terminal, the risk of an operating defect due to a degradation of this connecting equipment occurring during the use of the terminal in fixed mode is minimised.

According to a particular aspect of the disclosure, the terminal further comprises means for fastening a removable retaining part that covers at least a portion of the electronic autonomy management system when it is positioned in the terminal, with the means for fastening cooperating with complementary means for fastening on the retaining part in a locking position of the retaining part in the terminal, with the means for fastening and/or the complementary means for fastening being inaccessible in the locking position.

As such, according to this embodiment, a retaining part is placed on the electronic autonomy management system in order to allow for its locking in the terminal once the latter is transformed into a fixed/mobile terminal.

Indeed, according to an aspect of the disclosure, the user can easily transform the fixed terminal into a fixed/mobile terminal by proceeding himself with the inserting and the connecting of the electronic autonomy management system via for example a removable cover of the terminal. However, a succession of removals and settings into place of the electronic system can lead for example to a degradation of the electronic connectors, and therefore to malfunctions of the device over time. In order to limit the manipulations of the electronic autonomy management system, this embodiment of the disclosure provides that the autonomy management system by locked to the terminal during the normal use of it, as such protecting the electronic connecting equipment. For example, the retaining part can easily be fastened onto all or a portion of the electronic autonomy management system, but once it is fixed in the terminal, the means for fastening, and therefore for removing, that cooperate with the complementary means of the terminal, are no longer accessible if the terminal is not disassembled.

According to this embodiment, this retaining part may cover only a portion of the electronic autonomy management system, advantageously, the electronic portion of this autonomy management system. As such, the battery remains accessible for easy disassembly, with this wearing part able indeed to require several changes during the lifecycle of the terminal transformed into a fixed/mobile terminal.

For example, the means for fastening are means for clipping able to cooperate with the complementary means for fastening onto the retaining part.

As such, according to this embodiment, the retaining part can be set in place very easily by the user via a simple clipping onto the structure of the electronic terminal, with the means of clipping of the retaining part and of the terminal being rendered inaccessible without disassembling the terminal.

For example, the means for clipping correspond to one or several ergots cooperating with one or several slots, with the non-deformable portion of a clip being present on the terminal and the deformable portion on the retaining part.

According to a particular embodiment, the terminal is an electronic payment terminal.

An aspect of the disclosure also relates to an electronic autonomy management system of an electronic terminal such as described hereinabove, comprising at least one battery and at least one electronic autonomy management module of the terminal.

As such, an aspect of the disclosure also relates to the electronic system that makes possible the transformation of the fixed terminal into a fixed/mobile terminal, with this system comprising at least one battery and an electronic autonomy management module. Advantageously, the management module comprises all of the hardware components required to manage the autonomy of the terminal, i.e. the management of the recharging of the battery when the mains power supply is present as well as the generating of all of the regulated voltages required for the operation of the terminal in autonomous mode. As such, the cost of the fixed terminal devoid of the "autonomy" option remains minimal and similar to that of a standard fixed terminal.

In particular, the electronic autonomy management system further comprises a retaining part of the electronic autonomy management module.

As such, according to this embodiment, the autonomy management system comprises a retaining part of the management module allowing for the locking of the electronic autonomy management module under normal conditions of use of the terminal transformed into a fixed/mobile terminal, in such a way as to limit the manipulations of the electronic autonomy management system in order to limit the risks of degradation.

Finally, an aspect of the disclosure also relates to a method for updating a terminal such as described hereinabove, with the method comprising a step of integrating, into the electronic terminal, an autonomy management system such as described hereinabove.

Such a method is in fact a method for transforming a fixed terminal to a fixed/mobile terminal. Indeed, an aspect of the disclosure allows the user to carry out this operation very simply when he so desires during the lifecycle of his fixed terminal via a simple connection of the autonomy management system to his fixed terminal, thanks to the location provided for this purpose in the electronic terminal.

In particular, the step of integrating comprises a sub-step of connection to the electronic terminal of the battery of the autonomy management system and of the electronic autonomy management module of the autonomy management system.

As such, according to this embodiment, the method of transformation of the fixed terminal into a fixed/mobile terminal makes it possible on the one hand the connection of a battery and on the other hand the connection of an electronic autonomy management module. As such, the user can manage the battery differently, as a wearing part, and the electronic module.

Moreover, the step of integrating also comprises a sub-step of locking of the retaining part in the electronic terminal, when the connection sub-steps are carried out.

As such, according to this embodiment, the method of transformation of the fixed terminal into a fixed/mobile terminal also comprises a sub-step of setting up a retaining part allowing for the locking of the electronic autonomy management module under normal conditions of use of the terminal transformed into a fixed/mobile terminal.

LIST OF FIGURES

Other characteristics and advantages shall appear more clearly when reading the following description of a particular embodiment of the disclosure, provided as a simple and non-limiting example for the purposes of information, and of the annexed drawings, among which:

DETAILED DESCRIPTION OF THE INVENTION

The general principle of the technique described proposes a fixed electronic terminal that has the possibility of being transformed into a fixed/mobile terminal capable of correctly concluding a transaction in progress during a main power supply cut-off as well as authorising transactions in portable mode, without increasing the base cost of the terminal in fixed mode.

As such, the solution according to various embodiments of the disclosure makes it possible to achieve this transformation by connecting an electronic autonomy management system to the fixed terminal.

The connecting of the electronic autonomy management system can advantageously be reversible in order to allow for maintenance of the system and the changing of components where applicable.

In what follows, embodiments are described more particularly wherein the electronic terminal corresponds to an electronic payment terminal, but the disclosure applies to any electronic terminal that satisfies the same issues of portability.

Figure 1:
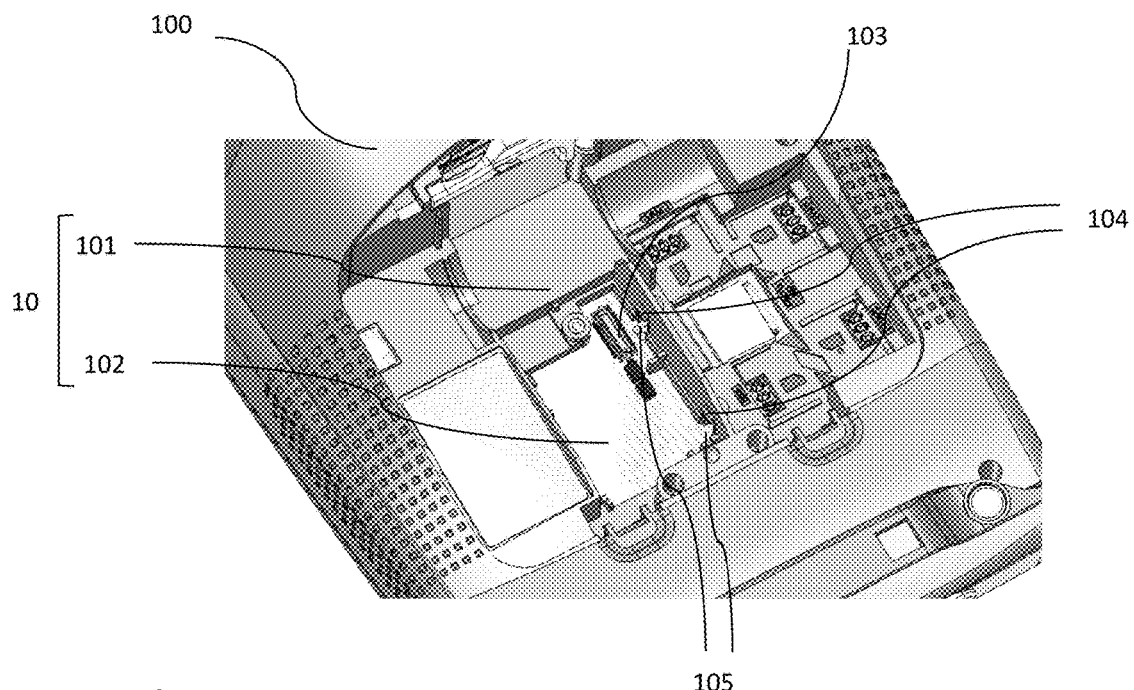
FIG. 1 is a view of a portion of a payment terminal having a location intended to reversibly receive an electronic autonomy management system according to an embodiment of the disclosure.

In relation with FIG. 1, an example of a fixed electronic payment terminal able to be transformed into a fixed/mobile electronic payment terminal according to an aspect of the disclosure shall now be described. According to this embodiment, the electronic autonomy management system of the fixed terminal is comprised of two separate elements, i.e. on the one hand a battery used as a reservoir of electrical energy and on the other hand an electronic autonomy management module embarking the functions required for charging the battery as well as for generating the power supplied required by the terminal.

As such, the fixed electronic payment terminal (100) according to this embodiment has a location (10) able to receive an electronic autonomy management system.

According to this embodiment, the location (10) comprises a first housing/location (101) able to receive the battery, and a second housing/location (102) able to receive the electronic autonomy management module, the battery and the electronic module forming the electronic autonomy management system of the terminal.

This electronic autonomy management module can be advantageously connected to the terminal via an inter-card connector (103) allowing for the exchange of all of the electrical signals between the two devices while still participating in the mechanical rigidity of the whole.

As such, the fixed electronic payment terminal (100) does not have any intrinsic elements specific to the management of the autonomy, contrary to "portable" terminals from prior art which are designed to integrate all of the autonomy management electronics (for example on the printed circuit of the electronic payment terminal) and to receive a battery that may be removable. Indeed, an electronic payment terminal according to various embodiments of the disclosure has at least one location intended to receive an electronic autonomy management system, as well as the connecting equipment elements required for the proper operation of the electronic payment terminal when it is transformed into a portable terminal (once connected to the electronic autonomy management system, i.e. the electronic autonomy management module and the battery for example). Moreover, the electronic autonomy management module and the battery were therefore designed in such a way as to allow for the proper operation of the electronic payment terminal in portable mode.

According to this embodiment, the battery can be accessed independently from the rest of the autonomy management system. As such, the changing of this wearing part of the system can be carried out simply and without having to interfere with the electronic autonomy management module. Except in case of a breakdown problem, the latter is effectively intended to remain fixed once installed in the terminal.

According to an embodiment, the terminal can have a fastener(s) for fastening (104) of a removable retaining part covering at least one portion of the electronic autonomy management system. In this case, the fastener cooperates with complementary elements present on the retaining part in order to fasten this last part.

Moreover, in this embodiment, orifices (105) are also present in order to allow access to the complementary elements of fastening from the inside of the terminal once the retaining part is put in place. As such, the latter can be removed once the terminal is disassembled.

The structure of a removable trap door (201) shall now be described in more detail, in relation with FIG. 2, according to an embodiment of the disclosure.

Figure 2:
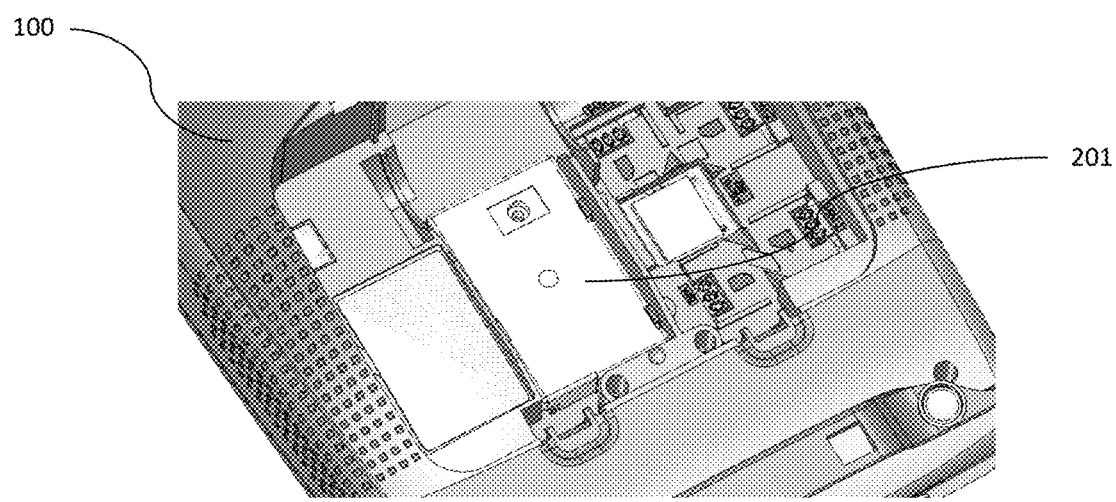
FIG. 2 shows an example of a removable trap door covering at least partially the location intended to reversibly receive an electronic autonomy management system according to an embodiment of the disclosure.

According to this particular embodiment of the disclosure shown in FIG. 2, the removable trap door (201) covers the location (102) able to receive the electronic autonomy management module. In particular, the connecting equipment intended to ensure the transport of the electrical signals between the terminal and the electronic autonomy management module are protected during the period when the fixed electronic terminal is operating without the presence of the electronic autonomy management system. As such, the owner of the terminal is assured that this connecting equipment will not be degraded the day when he chooses to invest in the "autonomy" option. The connection of the electronic autonomy management system to the electronic terminal will as such be optimal, minimising through the same the risks of a breakdown of the fixed/mobile electronic terminal.

Figure 3:
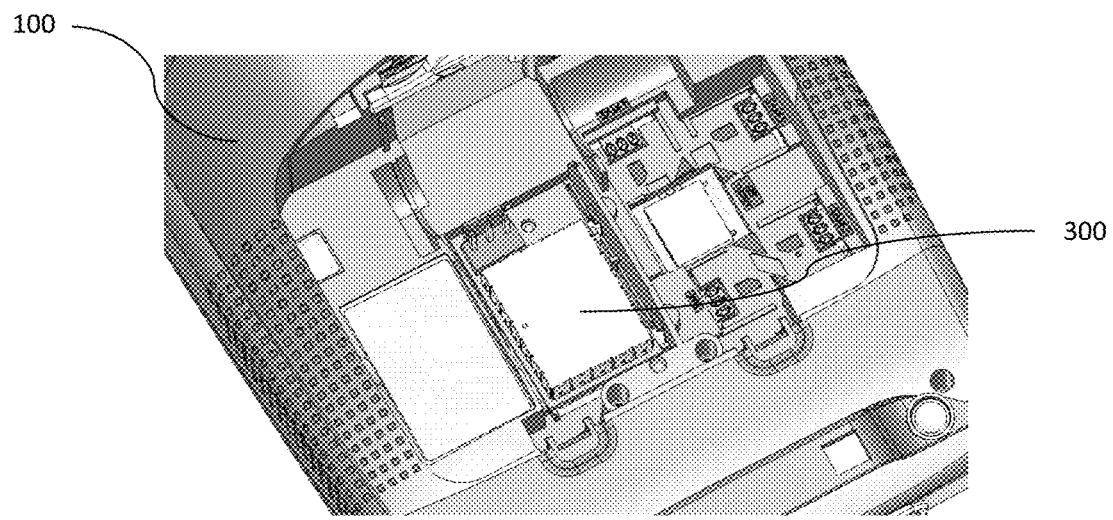
FIG. 3 shows an example of an electronic autonomy management module in place in the terminal according to an embodiment of the disclosure.

In relation with FIG. 3, an example of a fixed electronic payment terminal according to an aspect of the disclosure to which an electronic autonomy management module (300) has been connected shall now be described. As such, after having removed the removable trap door (201), the user can very simply insert the electronic autonomy management module into the location (102) provided for this purpose. Indeed, according to the embodiment shown in FIG. 3, the location (101) able to receive the battery as well as the location (102) able to receive the electronic management module are easily accessible to the user via for example a removable cover of the terminal.

According to an aspect of the disclosure, the electronic management module (300) advantageously comprises all of the electronic components required for managing autonomy. This is then converters and regulators required for the correct charging of the battery when the terminal is powered by the mains, as well as those required for the generating of all of the power supply levels required by the onboard electronics in the terminal in order to operate correctly. As such, the cost of the fixed terminal in the absence of the "autonomy" option remains minimal and very close to that of a standard fixed terminal.

Moreover, software portions required for the proper operation of the electronic autonomy management system can advantageously be embarked in the fixed terminal right from the start. As such, the fixed terminal can be able to detect the presence of the electronic autonomy management system via an electronic signal delivered by the latter, allowing by the same for a direct operation of the fixed/mobile terminal once the user has inserted and connected the battery and the electronic management module. In this way, no skills in electronics are required of the user in order to transform his fixed terminal into a fixed/mobile terminal.

Figure 4:
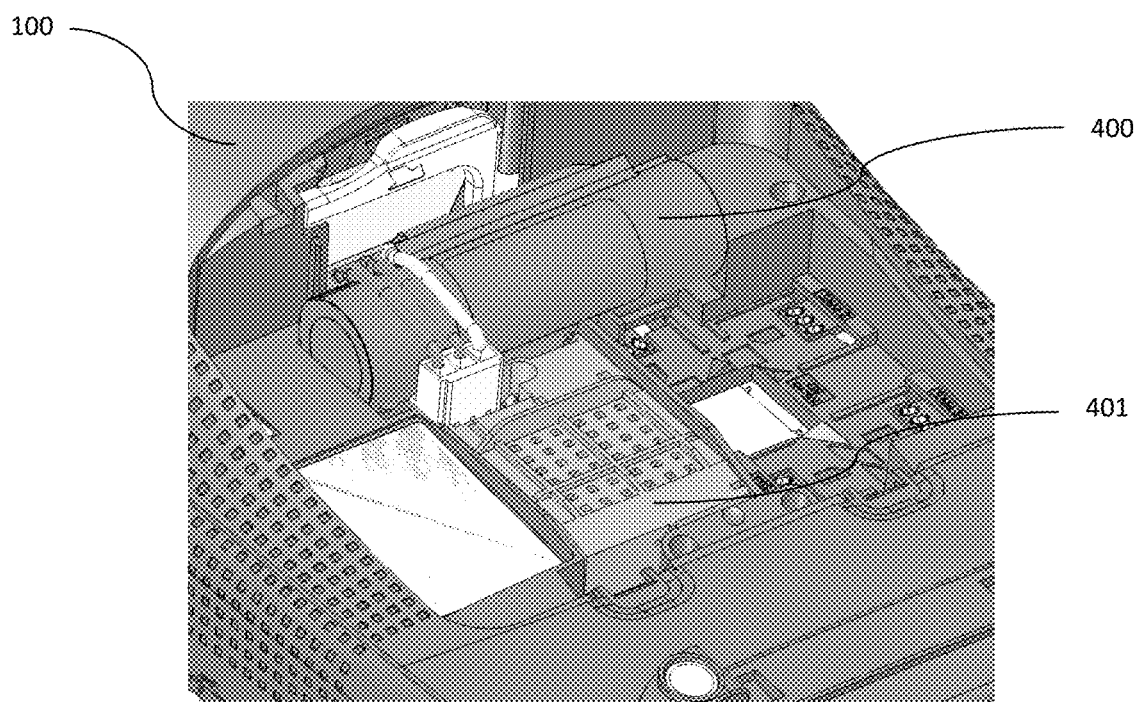
FIG. 4 shows an example of a retaining part covering and locking the electronic autonomy management module according to an embodiment of the disclosure.

The structure of a retaining part (401) shall now be described in more detail, in relation with FIG. 4, according to an embodiment of the disclosure.

According to this embodiment, the removable retaining part (401) that covers at least one portion of the electronic autonomy management system has fastener(s) for fastening that cooperate with those present on the electronic terminal in such a way that this retaining part cannot be removed without disassembling the electronic terminal.

As such, according to this embodiment, the retaining part can advantageously cover the autonomy management module, leading by the same to the locking of it once the retaining part is in place. As such, although easily set into place by the user via for example a removable cover of the terminal, the autonomy management module can no longer be easily removed by the same user. This makes it possible to guarantee a sustainable operation of the terminal by prohibiting the successive inserting and removing of the autonomy management module, which can cause its own degradation, or that of the connecting equipment of the terminal. On the contrary, as the battery (400) is a wearing part for which the changing can be necessary during the lifecycle of the fixed/mobile terminal, it can be interesting to not cover it with such a retaining part so that the extraction of it remains easy, for example via a removable cover of the terminal.

Figure 5:
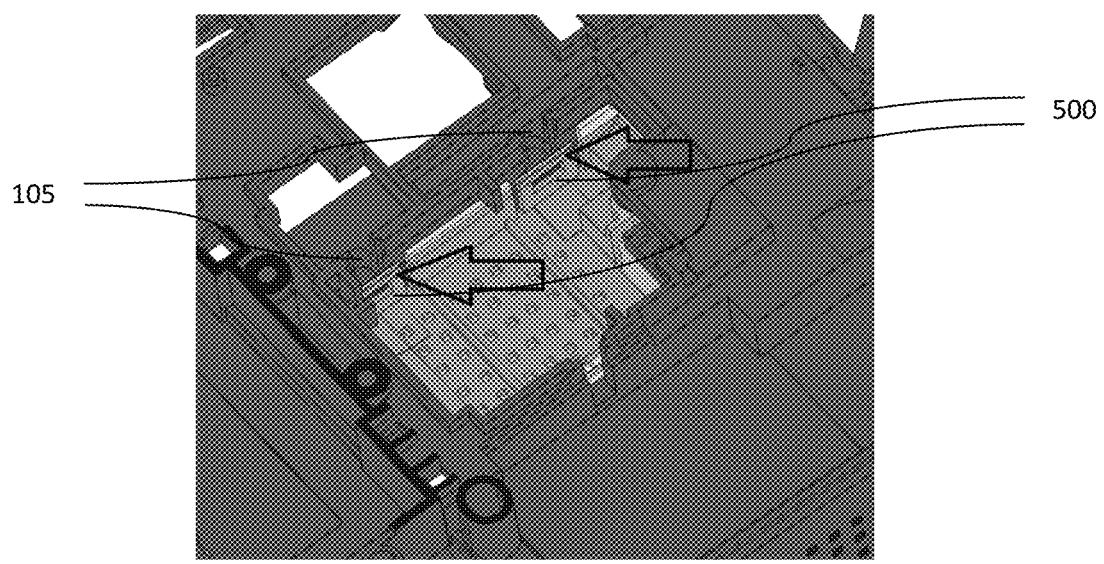
FIG. 5 shows an example of fastening of the retaining part covering and locking the electronic autonomy management module according to an embodiment of the disclosure.

The structure of the fastener(s) for fastening of a retaining part (401) shall now be described in more detail, in relation with FIG. 5, according to an embodiment of the disclosure.

According to this embodiment, the removable retaining part (401) that covers at least one portion of the electronic autonomy management system has clip(s) for clipping that cooperate with those present on the electronic terminal. More precisely, according to this embodiment the O-shaped lug (500) present on the retaining part corresponds to the deformable portion of the clipping system although the simple lug (104) present on the electronic terminal corresponds to the complementary non-deformable portion. During the setting in place of the retaining part in the electronic terminal via a removable cover of the terminal for example, these two complementary lugs cooperate in such a way as to fix/lock the retaining part to the electronic terminal. Those skilled in the art shall then immediately understand in reference to FIG. 4, that the direct access to the deformable portion of the clipping system, here the O-shaped lugs, via the removable cover of the terminal used for the setting in place of the retaining part is prohibited to the user once this retaining part is set in place. Removing this retaining part then requires disassembling the terminal in order to be able to access the orifices (105) via the inside of the terminal. As these orifices are provided in order to be able to access the deformable portions of these clipping systems, the unlocking of these systems is then again possible, thus allowing for the removal of the retaining part and by the same of at least one portion of the electronic autonomy management system.

An exemplary embodiment of the present disclosure proposes a new solution that does not have all of the disadvantages of prior art Although the present disclosure has been described with reference to one or more examples, workers skilled in the art will recognize that changes may be made in form and detail without departing from the scope of the disclosure and/or the appended claims.

The invention claimed is:

1. A fixed electronic terminal powered by a main power supply, the fixed electronic terminal comprising:
   a housing;
   at least one location in the housing configured to reversibly receive an electronic autonomy management system of said terminal, wherein the electronic autonomy management system comprises:
      a battery; and
      an electronic autonomy management circuit having electronic components to charge the battery when the terminal is powered by the main power supply and to power the fixed electronic terminal from the battery when the main power supply is cut-off; and
   an electrical connector at the at least one location, which connects the electronic autonomy management circuit to the terminal when the electronic autonomy management circuit is positioned in the terminal; and
   a removable trap door covering at least partially said location when the electronic autonomy management system is positioned in said terminal.

2. The fixed electronic terminal according to claim 1, wherein the terminal further comprises at least one fastener, which fastens a removable retaining part that covers at least one portion of said electronic autonomy management system when the electronic autonomy management system is positioned in said terminal, said at least one fastener cooperating with at least one complementary fastener on said retaining part in a locking position of said retaining part in said terminal, said at least one fastener and/or said at least one complementary fastener being inaccessible in said locking position.

3. The fixed electronic terminal according to claim 2 wherein said at least one fastener comprises at least one clip able to cooperate with said at least one complementary fastener on said retaining part.

4. The fixed electronic terminal according to claim 1, wherein said terminal is an electronic payment terminal.

5. The electronic autonomy management system according to claim 1, wherein the system further comprises a retaining part of said electronic autonomy management module.

* * * * *